United States Patent [19]

Gleim

[11] 3,849,292

[45] Nov. 19, 1974

[54] PROCESS FOR THE CONVERSION OF HEAVY HYDROCARBON CHARGE STOCKS

[75] Inventor: William K. T. Gleim, Island Lake, Ill.

[73] Assignee: Universal Oil Products Company, Des Plaines, Ill.

[22] Filed: Dec. 18, 1972

[21] Appl. No.: 316,169

Related U.S. Application Data

[62] Division of Ser. No. 283,900, Aug. 25, 1972, abandoned.

[52] U.S. Cl............ 208/111, 208/112, 208/208 M, 208/213, 208/216, 252/441, 252/455 R, 252/455 Z, 252/463, 252/464, 252/465, 252/476
[51] Int. Cl...................... C10g 13/02, C01b 33/28
[58] Field of Search .......... 208/108, 110, 111, 112, 208/213, 216; 252/441, 456, 461, 458, 465, 467, 476, 208–208 M

[56] References Cited
UNITED STATES PATENTS

| | | | |
|---|---|---|---|
| 1,938,328 | 12/1933 | Griffith ........................ | 252/432 X |
| 3,269,936 | 8/1966 | Goldthwait et al. ................ | 208/111 |
| 3,304,254 | 2/1967 | Eastwood et al. ................. | 208/111 |
| 3,525,699 | 8/1970 | Koppel et al. .................... | 252/433 |
| 3,714,026 | 1/1973 | Gleim .............................. | 208/108 |
| 3,715,303 | 2/1973 | Wennerberg et al. ............. | 208/112 |

Primary Examiner—Delbert E. Gantz
Assistant Examiner—G. E. Schmitkons
Attorney, Agent, or Firm—James R. Hoatson, Jr.; Robert W. Erickson; William H. Page, II

[57] ABSTRACT

Hydrocarbonaceous charge stocks, boiling beyond the normal gasoline boiling range, are reacted with hydrogen in contact with a catalytic composite comprising an alkali metal component and at least one metal component from Groups IV, V and VI. Asphaltenic charge stocks are processed via a slurry operation in which finely divided catalyst is admixed with the fresh feed. A fixed-bed system is utilized for feed stocks which are substantially asphaltene-free. In both instances, the catalytic composite is supported by a porous carrier material.

8 Claims, No Drawings

1

PROCESS FOR THE CONVERSION OF HEAVY HYDROCARBON CHARGE STOCKS

RELATED APPLICATION

The present application is a Division of my copending application, Ser. No. 283,900, filed Aug. 25, 1972, and is filed in compliance with a requirement for restriction in said co-pending application now abandoned.

All the teachings of co-pending application, Ser. No. 283,900, are incorporated herein by specific reference thereto.

APPLICABILITY OF INVENTION

The present invention is directed toward the use of a novel desulfurization catalytic composite for utilization in the conversion of heavy, sulfurous hydrocarbon charge stocks into desulfurized, lower-boiling hydrocarbon products. Applicable charge stocks are those having a normal initial boiling point above the gasoline boiling range i.e., in excess of a temperature of about 400°F. More specifically, the present invention is intended for the hydrorefining conversion of charge stocks boiling above a temperature of about 600°F. For convenience, the charge stocks may be catagorized in two classifications: (1) those which are substantially asphaltene-free, such as heavy vacuum gas oils, and (2) high-boiling hydrocarbonaceous material commonly referred to in the art as "black oils".

Considering first the hydrocarbonaceous black oils, these are heavy, asphaltene-containing petroleum crude oils, and the heavy distillates derived therefrom such as atmospheric tower bottoms products, vacuum tower bottoms products, crude oil residuum, topped crude oils, coal oil, oils extracted from tar sands, etc. The utilization of the catalyst of the present invention, in a slurry-type process, affords a high degree of asphaltene conversion into hydrocarbon-soluble products, while simultaneously effecting a substantial conversion of sulfurous and nitrogenous compounds.

Petroleum crude oils, and particularly vacuum residuum, contain high molecular weight sulfurous compounds in exceedingly large quantities, being in excess of about 1.0 percent by weight. In addition, such black oils contain excessive quantities of nitrogenous compounds, high molecular weight organometallic complexes, principally comprising nickel and vanadium, and asphaltic material. The high molecular weight asphalts are generally found to be complexed, or linked with sulfur, and, to a certain extent, with the organometallic contaminants. An abundant supply of such hydrocarbonaceous material currently exists, most of which has a gravity less than about 20.0 API. This material is generally further characterized in that 10.0 percent by volume, and generally more, has a normal boiling point above a temperature of about 1,050°F.

Specific examples of black oils, illustrative of those to which the present invention is applicable, include a vacuum tower bottoms product, having a gravity of 7.1 API, and containing 4.0 percent by weight of sulfur and 23.7 percent by weight of asphaltenes; and, a vacuum residuum, having a gravity of 8.8 API, and containing about 6.0 percent by weight of asphaltic material.

Asphaltic material consists primarily of high molecular weight, non-distillable coke precursors, insoluble in light hydrocarbons, and which, at the conditions required to obtain acceptable desulfurization, agglomerate and polymerize to the extent that the catalytically active surfaces and sites of the catalyst are effectively shielded from the material being processed. This detrimental effect generally precludes the utilization of a fixed-bed catalytic reaction system.

The catalyst of the present invention is a composite of a porous carrier material and an alkali metal component combined with at least one metal component from Groups IV, V and VI. When processing black oils of the type hereinabove described, the catalyst is employed in admixture with the charge stock, and the process is effected in slurry-type fashion. Thus, the asphaltic material and catalyst are maintained in a dispersed state within a principally liquid phase rich in hydrogen. Intimate contact is thus afforded between the asphaltic material and the catalyst, thereby effecting reaction with hydrogen; the liquid phase is itself dispersed in a hydrogen-rich gas phase so that the dissolved hydrogen is continuously replenished.

In addition to the hydrocarbon-insoluble asphaltenes, sulfurous and nitrogenous compounds, black oils contain greater quantities of metallic contaminants than are generally found in lighter hydrocarbon fractions. A reduction in the concentration of the organometallic contaminants, such as the metal porphyrins, is not easily achieved, and to the extent that the same no longer exert detrimental effects with respect to subsequent fixed-bed catalytic processing. When a metal-contaminated charge stock is subjected to a hydrocracking process, for example, to produce lower-boiling hydrocarbons, the metals become deposited upon the catalyst, steadily increasing in quantity until such time as the composition of the catalytic composite is changed to the extent that undesirable results are obtained.

The present process is also advantageously applicable to the hydrogenative conversion of heavy, asphaltenefree charge stocks such as heavy vacuum gas oils, deasphalted oils, and other charge stocks boiling principally above the gasoline boiling range. Such other charge stocks include light gas oils, diesel fuel, kerosene fractions and other middle-distillates, etc. Since these charge stocks are substantially free from asphaltenes and heavy metal complexes - - i.e. high molecular weight compounds boiling above about 1,050°F. - - the present process may be effected in a fixed-bed catalytic system. In this situation, the catalyst is generally in a physical form larger than the finely-divided material employed in the slurry-type operation. The catalysts may take any convenient shape such as ⅛-inch × ⅛-inch cylindrical pills, spheres having a nominal diameter of one-sixteenth-inch, extrudates, etc.

OBJECTS AND EMBODIMENTS

A principal object of my invention is to provide a novel catalytic composite for utilization in the hydrogenative conversion of hydrocarbonaceous feed stocks boiling above the gasoline boiling range.

Another object of the present invention involves a slurry-type process for the conversion of light hydrocarbon-insoluble asphaltics contained in black oil charge stocks. A corollary objective is directed toward a process for effecting the desulfurization and denitrification of asphaltene-free gas oils and other middle-distillates.

In one embodiment, therefore, the present invention encompasses a process for the conversion of a sulfurous, heavy hydrocarbonaceous charge stock, to produce desulfurized, lower-boiling hydrocarbon products, which process comprises reacting said charge stock with hydrogen in contact with a catalytic composite of a porous carrier material, an alkali metal component and at least one metal component from Groups IV, V and VI.

Other objects and embodiments of my invention relate to additional details regarding the preferred catalytic ingredients, the concentration of components within the catalytic composite, preferred processing techniques and similar particulars which are hereinafter given in the following, more detailed summary. In one such other embodiment, the catalytic composite contains from about 0.1 percent to about 15.0 percent by weight of the metal component from Groups IV, V and VI, and from 1.0 percent to about 30.0 percent by weight of the alkali metal component.

SUMMARY OF THE INVENTION

As hereinbefore stated, the present invention principally involves the utilization of a novel catalytic composite in a process for the hydrogenative conversion of heavy hydrocarbonaceous charge stocks. The catalytic composite constitutes a porous carrier material, either amorphous or zeolitic in character, an alkali metal component and at least one metal component from Groups IV, V and VI. The alkali metal component, lithium, sodium, potassium, rubidium, and/or cesium, will be present in an amount within the range of about 1.0 percent to about 30.0 percent by weight, calculated as the elemental metal. The metal component, or components, from Groups IV, V and VI, will be present in an amount within the range of about 0.1 percent to about 15.0 percent by weight, calculated as the elemental metal. Thus, in accordance with the *Periodic Table of The Elements*, E. H. Sargent and Co., 1964, the catalytic composite will contain at least one metal component selected from titanium, zirconium, hafnium, vanadium, niobium, tantalum, chromium, molybdenum and tungsten.

In a preferred embodiment, the catalyst will also contain a halogen component selected from the group of chlorine, bromine, iodine and fluorine. The halogen component will be present in an amount in the range which is less than that quantity stoichiometrically required to combine with all the alkali metal component. That is, the finished catalyst will contain some uncombined, or free alkali metal.

Considering first the porous carrier material, it may be either amorphous or zeolitic in character, or a combination of a crystalline aluminosilicate suspended within an amorphous matrix. Alumina-containing amorphous refractory inorganic oxides are preferred, especially when the alumina is combined with about 10.0 percent to about 90.0 percent by weight of silica. In many applications of the present invention, the carrier material will consist, at least in part, of a crystalline aluminosilicate. This may be naturally occurring, or synthetically prepared, and includes zeolitic material such as mordenite, faujasite, Type A or Type U molecular sieves, etc. In addition to the foregoing, the carrier material may comprise a combination in which the zeolitic material is dispersed within an amorphous matrix, the latter being alumina, silica, or silica-alumina.

The catalytic composite may be prepared by any suitable technique known in the art of catalyst manufacturing. Therefore, the precise manner which is selected is not considered essential to the present invention. One suitable method involves initially dissolving the selected alkali metal, for example, lithium, in liquid ammonia, and impregnating a previously prepared porous carrier material, for example alumina containing 37.0 percent by weight of silica, with the resulting solution. Ammonia removal is effectively conducted by way of evaporation at a relatively low temperature. After the porous, alkalized carrier material is dried, the same is reacted with a solution of at least one halide of a transitional metal from Groups IV, V or VI, at room or elevated temperatures. The amount of the transitional metal halide is limited by the amount of alkali already present on the carrier material. The halide reacts quantitively with the alkali metal, but it is preferred that some uncombined alkali metal remain on the finished carrier. For example, about 4.2 moles of sodium should be available on the porous carrier material for each mole of titanium tetrachloride. Following the second impregnation technique, the finished catalyst is dried and calcined in an atmosphere of hydrogen.

As hereinbefore set forth, when utilized for the conversion of asphaltene-containing black oils, the catalytic composite takes the form of finely-divided particles dispersed within the charge stock to form a slurry. In this instance, the catalyst is generally initially prepared in a larger form, for example, as ⅛-inch × ⅛-inch cylindrical pills. These are then ground to a talc-like powder having a nominal size of about 20 to about 200 mesh. Briefly, the process is effected by admixing the desired quantity of the catalytic composite with the hydrocarbon charge stock, in an amount such that the resulting colloidal suspension, or dispersion contains from about 5.0 percent to about 50.0 percent by weight of catalyst. The resulting colloidal dispersion is then passed into a suitable reaction zone maintained at a temperature within the range of about 225°C. to about 500°C. and under a hydrogen pressure of about 500 to about 5,000 psig. The hydrogen concentration, expressed as scf./Bbl. of charge stock, is within the range of about 1,000 to about 50,000, and it is preferred that the hydrogen contain hydrogen sulfide in an amount within the range of about 5.0 mol. percent to about 25.0 mol. percent. The process may be effected as a batch-type operation, or in a continuous manner in either upward flow of downward flow, with upward flow being preferred. The normally liquid hydrocarbons are separated from the total reaction zone product effluent by any suitable means, for example, by the utilization of a centrifuge, or settling tanks, the remaining metal-containing sludge being treated as hereinafter set forth.

The metal-containing sludge is a viscous fluid consisting of the finely-divided catalytic composite, unconverted asphaltenic material, soluble hydrocarbons, porphyrinic material containing nickel and vanadium, coke and other heavy carbonaceous material. The uncoverted asphaltenic material is in an amount of about 5.0 percent to about 20.0 percent by weight of the virgin asphaltenes, and this material is significantly more resistant to conversion; it is, therefore, that which causes an inordinately large proportion of the difficulties experienced when attempting the fixedbed processing black oil charge stocks. It is expedient and economical to remove about 5.0 percent to about 20.0 percent of the total asphaltenic material from the sludge prior to recirculating the same to combine with the fresh hydrocarbon charge stock. Following the separation of the normally liquid hydrocarbons from the total product effluent, the catalyst-containing sludge is treated with a suitable organic solvent for the purpose of dissolving residual organic-soluble material resulting from the conversion of the insoluble asphaltenic compounds. Any well known organic solvent may be employed for the dissolution of the organic-soluble material in the sludge and the resulting solution may be subjected to further reaction with hydrogen by recycling the same to combine with fresh hydrocarbon charge stock. Suitable solvents include aromatic hydrocarbons such as benzene, toluene and the xylenes, methylnaphthalene, etc.

When processing substantially asphaltene-free charge stocks, such as a heavy vacuum gas oil, the catalytic composite of the present invention may be disposed as a fixed-bed in an elongated reaction zone. The operating conditions imposed upon the reaction zone, or zones, are primarily dependent upon the charge stock properties and the desired end result. However, these conditions will include a maximum catalyst bed temperature in the range of about 600°F. to about 900°F. Other operating variables include a pressure of from about 500 to about 5,000 psig., a liquid hourly space velocity (defined as volumes of fresh feed charge stock per hour, per volume of catalyst disposed within the reaction zone) of about 0.1 to about 5.0 and a hydrogen concentration of about 1,000 to about 50,000 scf./Bbl. In view of the fact that the reactions are exothermic in nature, an increasing temperature gradient will be experienced as the hydrogen and feed stock traverse the catalyst bed. Judicious operating techniques generally dictate that the temperature gradient be limited to a maximum of about 100°F., and, in order to insure that the temperature does not exceed the maximum allowed, conventional quench streams, either normally liquid or normally gaseous may be introduced at one or more intermediate loci of the catalyst bed. A portion of the normally liquid product effluent from the fixed-bed catalytic reaction zone, boiling above the end boiling point of the desired product, may be recycled to combine with the fresh feed charge stock. In this situation, the combined liquid feed ratio to the catalytic reaction zone will be in the range of about 1.1 to about 6.0.

EXAMPLES

Specific operating conditions, processing techniques, particular catalytic composites and other individual process details will be given in the following illustrations of the present invention as applied to both a black oil charge stock and one which is substantially asphaltene-free. It is not intended that the present invention be limited the specifics, nor is it intended that the process be limited to the particular operating conditions, catalytic composite, processing techniques, charge stocks, etc.

EXAMPLE I

The fresh feed charge stock in this illustrative embodiment is a vacuum tower bottoms having a gravity of 9.8 API and a 3.0 percent volumetric distillation temperature of about 1,050°F. Contaminating influences include 5.2 percent by weight of hydrocarbon-insoluble asphaltics, 3.06 percent by weight of sulfur, 4,030 ppm. by weight of nitrogen and a total metals concentration of about 100 ppm. The catalytic composite utilizes a carrier material of 63.0 percent by weight of alumina and 37.0 percent by weight of silica. The catalytically active ingredients include about 4.5 percent by weight of vanadium and about 15.0 percent by weight of potassium. Halogen, in the form of chloride ion, is added to the composite to the extent that approximately 10.0 percent by weight of the potassium component exists in the free state.

The catalytic reaction zone is pressured to a level of about 3,000 psig., utilizing compressive hydrogen recycle in an amount of about 15,000 scf./Bbl.; the hydrogen recycle stream contains about 7.5 mol. percent hydrogen sulfide. The vacuum tower bottoms is admixed with about 25.0 percent by weight of the catalytic composite existing in a finely divided state, and the mixture is circulated through a block heater at a temperature of about 250°C. for a period of about 1 hour. The temperature of the block heater is increased to a level such that the temperature gradient, as measured from the reaction zone inlet to the outlet thereof, is controlled in the range of about 375°C. to about 400°C. The fresh feed charge rate is about 220 milliliters per hour, and make-up hydrogen is added in an amount of about 14.30 scf./Bbl.

Following a line-out period, analyses of the normally liquid product effluent from an 8-hour period indicate greater than about 95.0 percent conversion of the insoluble material, less than about 12.0 ppm. of metals and a gravity of about 16.0 API.

EXAMPLE II

In this example, the charge stock is a heavy vacuum gas oil having an initial boiling point of 560°F. and an end boiling point of 1010°F. The gas oil contains approximately 2.8 percent by weight of sulfur and 800 ppm. by weight of nitrogen. The intended object is to recover maximum quantities of a naphtha fraction, heptane-400°F., a light kerosene fraction, 400°F.-465°F., and a middledistillate fraction, 465°F.-675°F. The carrier material constitutes a crystalline aluminosilicate of the faujasite modification dispersed within an alumina-silica matrix comprising 75.0 percent by weight of alumina; the faujasite is present in an amount of about 65.0 percent by weight. The catalytically active ingredients include about 3.5 percent by weight of tungsten, 5.0 percent by weight of vanadium and about 18.0 percent by weight of sodium. Halogen, in the form of a 50/50 mixture of chlorine and fluorine, is combined therewith to the extent that about 5.0 percent by weight of the sodium exists in the free state. The vacuum gas oil is processed down flow in a fixed-bed reaction zone maintained at a pressure of about 2,500 psig. The maximum catalyst bed temperature is maintained at about 875°F., and the charge stock, in admixture with 6,500 scf./Bbl. of hydrogen, traverses the catalyst bed at a liquid hourly space velocity of about 0.9. Following separation of the total product effluent, that portion boiling in excess of about 675°F. is recycled to combine with the fresh vacuum oil charge stock; this results in a combined liquid feed ratio to the reaction zone of about 1.17.

Component product distribution and yields thereof are presented in the following table:

TABLE

Product Distribution and Yields

| Component | Wt.% * | Vol.% |
|---|---|---|
| Ammonia | 0.10 | — |
| Hydrogen Sulfide | 2.98 | — |
| Methane | 0.35 | — |
| Ethane | 0.57 | — |
| Propane | 1.15 | — |
| Butanes | 2.29 | 3.63 |
| Pentanes | 1.84 | 2.67 |
| Hexanes | 2.31 | 3.04 |
| Heptane-400°F. | 30.47 | 36.41 |
| 400°F.-465°F. | 13.46 | 15.39 |
| 465°F.-675°F. | 46.89 | 52.29 |

* Includes $H_2$ consumption of 2.41% by weight.

Analyses indicate that the desired normally liquid product fractions are substantially free from both sulfurous and nitrogenous compounds. The heptane-400°F. naphtha fraction has a gravity of 53.9 API and contains 35.6 percent by volume of paraffins, 57.4 percent naphthenes and 7.1 percent aromatic hydrocarbons. It will be recognized by those possessing expertise in the petroleum refining art that the naphtha fraction constitutes an acceptable feed stock for a subsequent catalytic reforming system.

The foregoing specification and examples indicate the method by which the present invention is effected and illustrate the benefits to be affored through the utilization thereof.

I claim as my invention:

1. A process for the conversion of a sulfurous, heavy hydrocarbonaceous charge stock, to produce desulfurized, lower-boiling hydrocarbon products, which comprises reacting said charge stock with hydrogen in contact with a catalytic composite of a porous alumina-containing carrier material, from about 1.0 percent to about 30.0 percent by weight of an alkali metal component and from about 0.1 percent to about 15.0 percent by weight of at least one metal component from Groups IV B, V B and VI B, a portion of said alkali metal component being in the free state and said carrier material being selected from the group consisting of alumina, alumina-silica, crystalline aluminosilicate, and crystalline aluminosilicate dispersed in an alumina-silica matrix.

2. The process of claim 1 further characterized in that said charge stock has an end boiling point above the gasoline boiling range.

3. The process of claim 1 further characterized in that said charge stock is an asphaltene-containing black oil.

4. The process of claim 1 further characterized in that said carrier material comprises a crystalline aluminosilicate.

5. The process of claim 1 further characterized in that said carrier material comprises a crystalline aluminosilicate dispersed in an alumina-silica matrix.

6. The process of claim 1 further characterized in that said catalytic composite contains a halogen component.

7. The process of claim 6 further characterized in that said halogen component is in an amount less than the stoichiometric amount necessary to combine with said alkali metal component.

8. The process of claim 1 further characterized in that said carrier material is a combination of alumina with about 10.0 percent to about 90.0 percent by weight of silica.

* * * * *